(12) United States Patent
Qiu et al.

(10) Patent No.: US 8,470,900 B2
(45) Date of Patent: Jun. 25, 2013

(54) POROUS POLYMER AND SYNTHETIC METHOD THEREOF

(71) Applicant: Shen Zhen Poremat Technology Co. Ltd., Shen Zhen (CN)

(72) Inventors: Shilun Qiu, Changchun (CN); Guangshan Zhu, Changchun (CN); Teng Ben, Changchun (CN)

(73) Assignee: Shen Zhen Poremat Technology Co. Ltd., Shen Zhen (CN)

( * ) Notice: Subject to any disclaimer, the term of this patent is extended or adjusted under 35 U.S.C. 154(b) by 0 days.

(21) Appl. No.: 13/652,113

(22) Filed: Oct. 15, 2012

(65) Prior Publication Data

US 2013/0041060 A1    Feb. 14, 2013

Related U.S. Application Data

(62) Division of application No. 12/564,963, filed on Sep. 23, 2009.

(30) Foreign Application Priority Data

Jun. 29, 2009   (CN) .......................... 2009 1 0108154
Jul. 20, 2009   (CN) .......................... 2009 1 0108821

(51) Int. Cl.
*C08F 14/00*   (2006.01)
*C08F 12/00*   (2006.01)
*C08G 77/00*   (2006.01)
*C08G 77/08*   (2006.01)

(52) U.S. Cl.
USPC ............................... 521/146; 528/19; 528/43

(58) Field of Classification Search
USPC ....................................... 521/146; 528/19, 43
See application file for complete search history.

(56) References Cited

U.S. PATENT DOCUMENTS

2010/0105786 A1\* 4/2010 Onodera et al. ................ 521/27

FOREIGN PATENT DOCUMENTS

WO    WO 2005-0735535    \*   5/2005

OTHER PUBLICATIONS

Liu et al., "Hyperbranched Blue-Light-Emitting Alternating Copolymers of Tetrabromoarylmethane/Silane and 9,9-Dihexylfluorene-2,7-diboronic Acid." Jun. 18, 2004. Macromolecules (2004), 37. pp. 5965-5970.\*

(Continued)

*Primary Examiner* — Randy Gulakowski
*Assistant Examiner* — Kara Boyle
(74) *Attorney, Agent, or Firm* — Jackson IPG PLLC

(57) ABSTRACT

The present invention relates to a porous polymer and a synthetic method thereof. The porous polymer has the following general formula:

$$\left[\begin{array}{c} \mid_n \\ R_1 \\ \mid \\ (R_4-A-R_2)_{\overline{n}} \\ \mid \\ R_3 \end{array}\right]$$

$A = C, Si, N^+, P^+, B^-$ $—R_1—, \quad —R_2—, \quad —R_3—, \quad —R_4— =$ wherein, the positions marked with the numeral 1-10 are C, CH, N, or CH with its H being substituted by methyl, ethyl, amido, carboxyl, methoxyl, hydroxyl, or ester group; the positions marked with letter a or b are C, N+, or B−.

4 Claims, 9 Drawing Sheets

OTHER PUBLICATIONS

Han et al., "Covalent Organic Frameworks as Exceptional Hydrogen Storage Materials," 2008, JACS, vol. 130, pp. 11580-11581.*

El-Kaderi et al., "Designed Synthesis of 3D Covalent Organic Frameworks," Apr. 13, 2007, Science Magazine, vol. 316, pp. 268-272.*

* cited by examiner

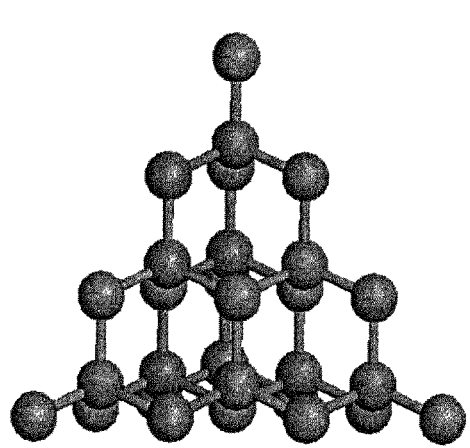
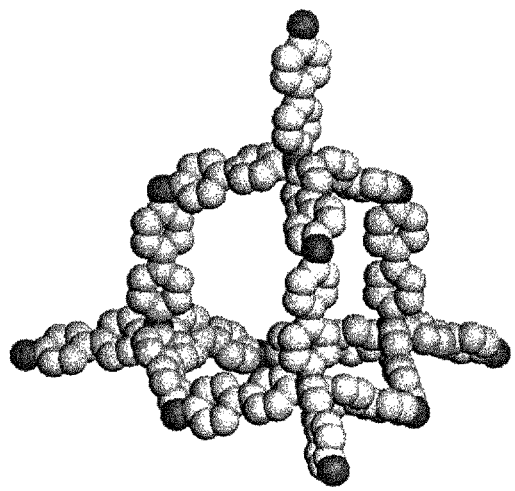
Fig. 1A                                                       Fig. 1B
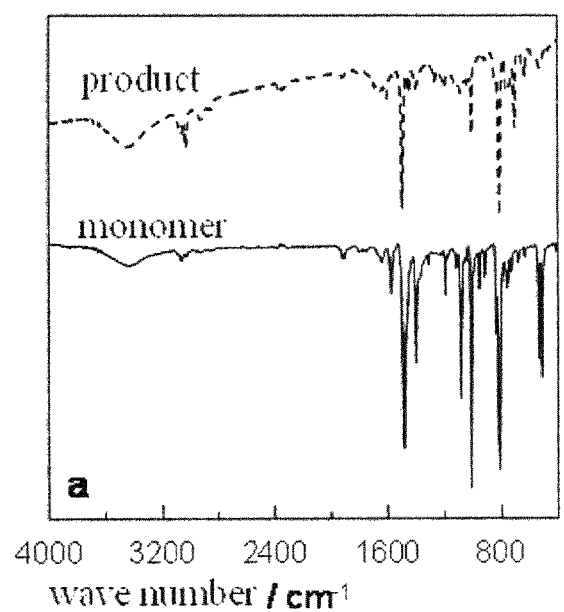
Fig. 2A

POROUS POLYMER AND SYNTHETIC METHOD THEREOF

FIELD OF THE INVENTION

The present invention relates to functional materials, particularly relates to a series of porous polymer and a synthetic method thereof.

BACKGROUND OF THE INVENTION

One of the most serious problems today is that the natural disasters caused by the warming climate become increasingly severe, of which the major cause is that, the greenhouse gases increase day by day for using fossil fuels. Now, all the governments and enterprises in the world pay great attention to develop techniques about new clean energy source. At the same time, the Kyoto Protocol about energy utilization and limiting the emission of greenhouse gases is approved by more and more countries. How to increase the energy utilization efficiency and reduce the environmental pollution has become a problem that the countries in the world pay great attention to.

The fuel cell technology is currently one of the acknowledged core technologies in the energy technology field of the 21st century. The working principle of a fuel cell is to directly isothermally transform the chemical energy stored in fuels and oxidants into electrical energy. Comparing with a normal fuel engine, the fuel cell has the advantages of high efficiency, low noise, high reliability, and especially very low emission, which is considered as the currently preferred power generation technology that is clean and highly efficient. The fuel cell can be widely used in power plants, the automobile industry, or portable devices. For more detailed presentations about fuel cells, please refer to *Int. J. Hydrogen Energy* (22, No. 6, 601-610 (1997)) compiled by Hynek, et al., the thesis of J. A. Kerres, et al. in *Journal of Membrane Science* (185, 2001, 3-27), and the survey article of G. March in *Materials Today* (4, No. 2 (2001), 20-24).

Porous materials have a comparatively large specific surface area, and can adsorb more gas or small organic molecules that can be used as fuels. So, the development of porous materials is the most important thing in the field of key materials research of a fuel cell. Porous materials comprise microporous materials having pore size less than 2 nm, mesoporous materials having pore size between 2 nm and 50 nm, and macroporous materials having pore size bigger than 50 nm. In 1995, Omar Yaghi synthesized the MOF (metal-organic-framework) (referring to *Nature*, 1995, (378), 703), a metal-organic coordination polymer that is really close to practical application. As a new functional molecular material, the MOF not only has a crystal structure similar to the zeolite molecular sieve, but also its structure is capable of being designed. The MOF can obtain nano-size pore channels and cavities by directionally designing the topological structure and expanding the organic functional groups. So, it has great potential in applications of storing gas or organic molecules. However, the MOF has a comparative poor chemical stability. In 2005, Omar Yaghi disclosed the COF (covalent organic framework) (referring to *Science*, 2005, (310), 1166), an organic porous framework material, which is composed of light elements (C, H, O, B) being connected via covalent bonds. However, the chemical stability problem is not really solved.

Therefore, the performance of porous polymers is still to be improved further.

SUMMARY OF THE INVENTION

The first object of the present invention is to provide a porous polymer, which has good thermal stability, good hydrothermal stability, and super high BET specific surface area.

The second object of the present invention is to provide a synthetic method of a porous polymer, which has high yield.

To achieve the above mentioned objects, the present invention provides a porous polymer, which has the general formula of:

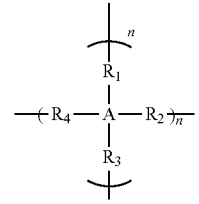

$A = C, Si, N^+, P^+, B^-$

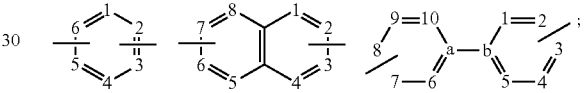

wherein, the positions marked with the numeral 1-10 are C, CH, N, or CH with its H being substituted by methyl, ethyl, amido, carboxyl, methoxyl, hydroxyl, or ester group; the positions marked with letter a or b are C, $N^+$, or $B^-$.

The present invention also provides a synthetic method of a porous polymer, which comprises the following steps:

Step 1, adding bis(1,5-cycloocta-1,5-diene)nickel(0), 2,2'-bipyridyl, and 1,5-cycloocta-1,5-diene with the molar ratio thereof being 1:(0-15):(0-15) to a solution of DMF (N,N-dimethyl-Formamide) or toluene, and heating the mixture at 20-140° C. for 0-10 hours;

Step 2, adding corresponding quantity of reactive monomer to the resultant solution, keeping the initial concentration of the monomer between 0.001 M and 5 M, and at the same time, making the initial molar ratio of bis(1,5-cycloocta-1,5-diene)nickel(0) to the monomer to be (2-18):1;

Step 3, stirring the above mentioned mixture at 20-140° C. for 10 minutes to 10 days;

Step 4, cooling the mixture to room temperature, and then adding conc. HCl to the mixture;

Step 5, filtrating the mixture to obtain the residue, then washing the residue with hot water, THF and $CHCl_3$ respectively, and then drying the residue in vacuum for 4-40 hours at 80-200° C. to obtain the porous polymer.

Wherein, the reaction is Yamamoto type Ullmann reaction.

The present invention also provides a synthetic method of a porous polymer, which comprises the following steps:

Step 1, adding $NiCl_2$, NaBr, Zn powder, and $PPh_3$ with the molar ratio thereof being 1:(0-15):(1-15):(0-15) to a solution of DMF or toluene, and heating the mixture at 20-140° C. for 0-10 hours;

Step 2, adding corresponding quantity of reactive monomer to the resultant solution, keeping the initial concentration of the monomer between 0.001 M and 5 M;

Step 3, stirring the above mentioned mixture at 20-140° C. for 10 minutes to 10 days;

Step 4, cooling the mixture to room temperature, and then adding conc. HCl to the mixture;

Step 5, filtrating the mixture to obtain the residue, then washing the residue with hot water, THF and CHCl$_3$, respectively, and then drying the residue in vacuum for 4-40 hours at 80-200° C. to obtain the porous polymer.

Wherein, the reaction is Ullmann coupling reaction.

The present invention also provides a synthetic method of a porous polymer, which comprises the following steps:

Step 1, adding monomer with its initial concentration being 0.001 M-5 M, and Pd(PPh$_3$)$_4$ with its initial molar concentration being 0.05%-50% of the molar concentration of the monomer to a solution of DMF or toluene, and stirring the mixture for 0-10 hours under nitrogen atmosphere;

Step 2, adding aqueous alkaline solution with its initial molar concentration being 4-200 times of the molar concentration of the monomer to the resultant solution;

Step 3, heating the above mentioned solution at 20-140° C. for 10 minutes to 10 days;

Step 4, cooling the mixture to room temperature, and then adding conc. HCl to the mixture;

Step 5, filtrating the mixture to obtain the residue, then washing the residue with hot water, THF and CHCl$_3$, respectively, and then drying the residue in vacuum for 4-40 hours at 80-200° C. to obtain the porous polymer.

Wherein, the reaction is Suzuki coupling reaction.

Wherein, Step 5 comprises the following steps:

Step 5.1, treating the above mentioned crude polymer by 10-100 ml water at 50-100° C. for 3-5 times and then isolating the above mentioned crude polymer by filtration;

Step 5.2, treating the above mentioned crude polymer by 10-100 ml THF at 20-70° C. for 3-5 times and then isolating the above mentioned crude polymer by filtration.

Step 5.3, treating the above mentioned crude polymer by 10-100 ml CHCl$_3$ at 20-60° C. for 3-5 times and then isolating the above mentioned crude polymer by filtration;

Step 5.4, drying the polymer in vacuum at 3-10 mmHg for 4-40 hours at 80-200° C., and then obtaining the pure porous polymer.

Wherein, the general formula of the monomer that is used in the Yamamoto type Ullmann reaction and Ullmann coupling reaction is:

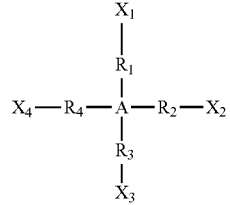

A = C, Si, N$^+$, P$^+$, B$^-$

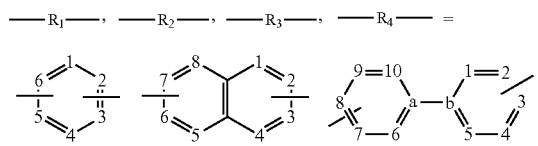

X$_1$, X$_2$, X$_3$, X$_4$ = Cl, Br, I;

wherein, the positions marked with the numeral 1-10 are C, CH, N, or CH with its H being substituted by methyl, ethyl, amido, carboxyl, methoxyl, hydroxyl, or ester group; the positions marked with letter a or b are C, N$^+$, or B$^-$.

Wherein, the general formula of the monomer that is used in the Suzuki coupling reaction is:

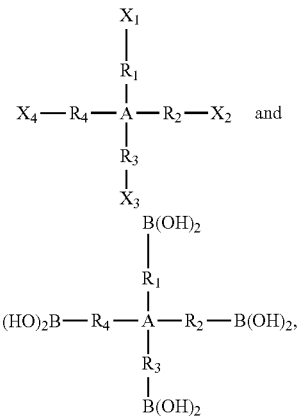

A = C, Si, N$^+$, P$^+$, B$^-$

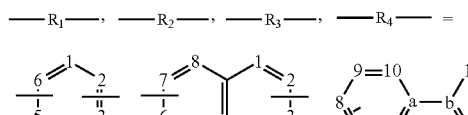

X$_1$, X$_2$, X$_3$, X$_4$ = Cl, Br, I;

wherein, the positions marked with the numeral 1-10 are C, CH, N, or CH with its H being substituted by methyl, ethyl, amido, carboxyl, methoxyl, hydroxyl, or ester group; the positions marked with letter a or b are C, N$^+$, or B$^-$.

In summary, the porous polymer of the present invention has excellent thermal stability and good hydrothermal stability, which can be widely used in fields of energy source, or electric appliance, and so on, such as a power plant, an automobile, a wireless electric equipment, a mobile phone, or a portable device. Particularly, the present invention can be used as the carrier of fuel in a fuel cell using fuels such as hydrogen, with big specific surface area, high stability, and high efficiency in recycling use. The synthetic method of the porous polymer of the present invention has high yield.

The characteristic and the technical solution of the present invention are best understood from the following detailed description.

BRIEF DESCRIPTION OF THE DRAWINGS

FIGS. 1A and 1B provide the topology structures of polymerization products from the monomer in accordance with an embodiment of the present invention;

FIG. 2A provides the FT-IR spectra of the polymerization products from the monomer in accordance with an embodiment of the present invention from 400-4000 cm$^{-1}$;

DESCRIPTION OF THE PREFERRED EMBODIMENTS

Figure 2B:
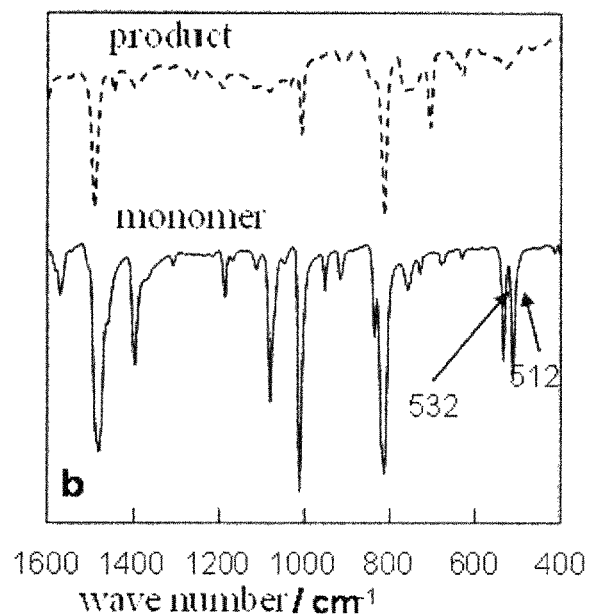
FIG. 2B provides the characterization absorption bands for Carbon-Bromine highlighted, clearly showing the lack of bromine in the final product and indicating the formation of the porous polymer.

The following embodiments and examples of this invention are meant as an illustration of the microporous materials that are obtained using the synthetic strategy defined by this invention, and are not meant to limit in any way the scope of the invention.

The present invention provides a porous polymer, which has the general formula of:

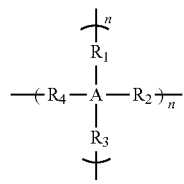

A = C, Si, N⁺, P⁺, B⁻

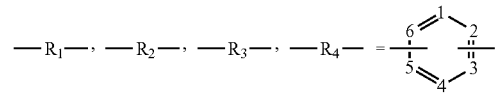

wherein, the positions marked with the numeral 1-10 are C, CH, N, or CH with its H being substituted by methyl, ethyl, amido, carboxyl, methoxyl, hydroxyl, or ester group; the positions marked with letter a or b are C, N⁺, or B⁻.

The present invention provides three synthetic methods of the above mentioned porous polymer: Yamamoto type Ullmann reaction, Ullmann reaction, and Suzuki coupling reaction. The porous polymer of the present invention can be obtained by all the three methods. Some performance of the porous polymers obtained via the three synthetic methods may be different, but these different synthetic methods will not lead to any limitation to the practical application of these porous polymers.

To clearly describe the three synthetic methods of the porous polymer of the present invention, poly (tetra p-phenylsilane) is cited as an example to detailedly describe the present invention.

Poly (tetra p-phenylsilane) is synthesized by Yamamoto type Ullmann reaction, which can be shown as the following reaction equation:

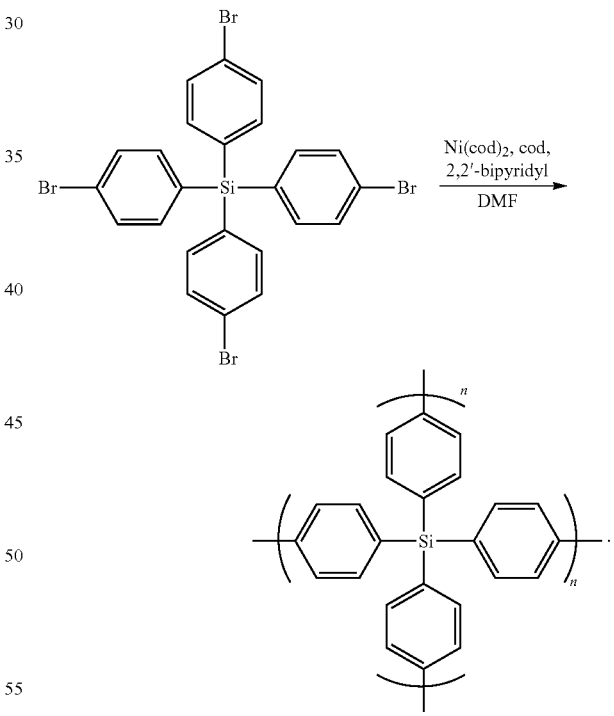

The reaction type is Yamamoto type Ullmann coupling reaction, and the catalyst used in the reaction is the mixture of bis(1,5-cycloocta-1,5-diene)nickel(0), 2,2'-bipyridyl, and 1,5-cycloocta-1,5-diene.

The synthetic method comprises the following steps:

Step 1, adding bis(1,5-cycloocta-1,5-diene)nickel(0), 2,2'-bipyridyl, and 1,5-cycloocta-1,5-diene with the molar ratio thereof being 1:(0-15):(0-15) to a solution of DMF (N,N-dimethyl-Formamide) or toluene, and heating the mixture at 20-140° C. for 0-10 hours;

Step 2, adding corresponding quantity of reactive monomer to the resultant solution, keeping the initial concentration of the monomer between 0.001 M and 5 M, and at the same time, making the initial molar ratio of bis(1,5-cycloocta-1,5-diene)nickel(0) to the monomer to be (2-18):1;

Step 3, stirring the above mentioned mixture at 20-140° C. for 10 minutes to 10 days;

Step 4, cooling the mixture to room temperature, and then adding conc. HCl to the mixture;

Step 5, filtrating the mixture to obtain the residue, then washing the residue with hot water, THF and $CHCl_3$ respectively, and then drying the residue, in vacuum for 4-40 hours at 80-200° C. to obtain the porous polymer.

Step 5 comprises the following steps:

Step 5.1, treating the above mentioned crude polymer by 10-100 ml water at 50-100° C. for 3-5 times and then isolating the above mentioned crude polymer by filtration;

Step 5.2, treating the above mentioned crude polymer by 10-100 ml THF at 20-70° C. for 3-5 times and then isolating the above mentioned crude polymer by filtration;

Step 5.3, treating the above mentioned crude polymer by 10-100 ml $CHCl_3$ at 20-60° C. for 3-5 times and then isolating the above mentioned crude polymer by filtration;

Step 5.4, drying the polymer in vacuum at 3-10 mmHg for 4-40 hours at 80-200° C., and then obtaining the pure porous polymer.

Poly (tetra p-phenylsilane) is synthesized by Ullmann reaction, which can be shown as the following reaction equation:

The reaction type is Ullmann reaction, and the catalyst used in the reaction is the system of Zn powder, $NiCl_2$, NaBr, and $PPh_3$.

The synthetic method comprises the following steps:

Step 1, adding $NiCl_2$, NaBr, Zn powder, and $PPh_3$ with the molar ratio thereof being 1:(0-15):(1-15):(0-15) to a solution of DMF or toluene, and heating the mixture at 20-140° C. for 0-10 hours;

Step 2, adding corresponding quantity of reactive monomer to the resultant solution, keeping the initial concentration of the monomer between 0.001 M and 5 M;

Step 3, stirring the above mentioned mixture at 20-140° C. for 10 minutes to 10 days;

Step 4, cooling the mixture to room temperature, and then adding conc. HCl to the mixture;

Step 5, filtrating the mixture to obtain the residue, then washing the residue with hot water, THF and $CHCl_3$, respectively, and then drying the residue in vacuum for 4-40 hours at 80-200° C. to obtain the porous polymer.

Step 5 comprises the following steps:

Step 5.1, treating the above mentioned crude polymer by 10-100 ml water at 50-100° C. for 3-5 times and then isolating the above mentioned crude polymer by filtration;

Step 5.2, treating the above mentioned crude polymer by 10-100 ml THF at 20-70° C. for 3-5 times and then isolating the above mentioned crude polymer by filtration;

Step 5.3, treating the above mentioned crude polymer by 10-100 ml $CHCl_3$ at 20-60° C. for 3-5 times and then isolating the above mentioned crude polymer by filtration;

Step 5.4, drying the polymer in vacuum at 3-10 mmHg for 4-40 hours at 80-200° C., and then obtaining the pure porous polymer.

Poly (tetra p-phenylsilane) is synthesized by Suzuki coupling reaction, which can be shown as the following reaction equation:

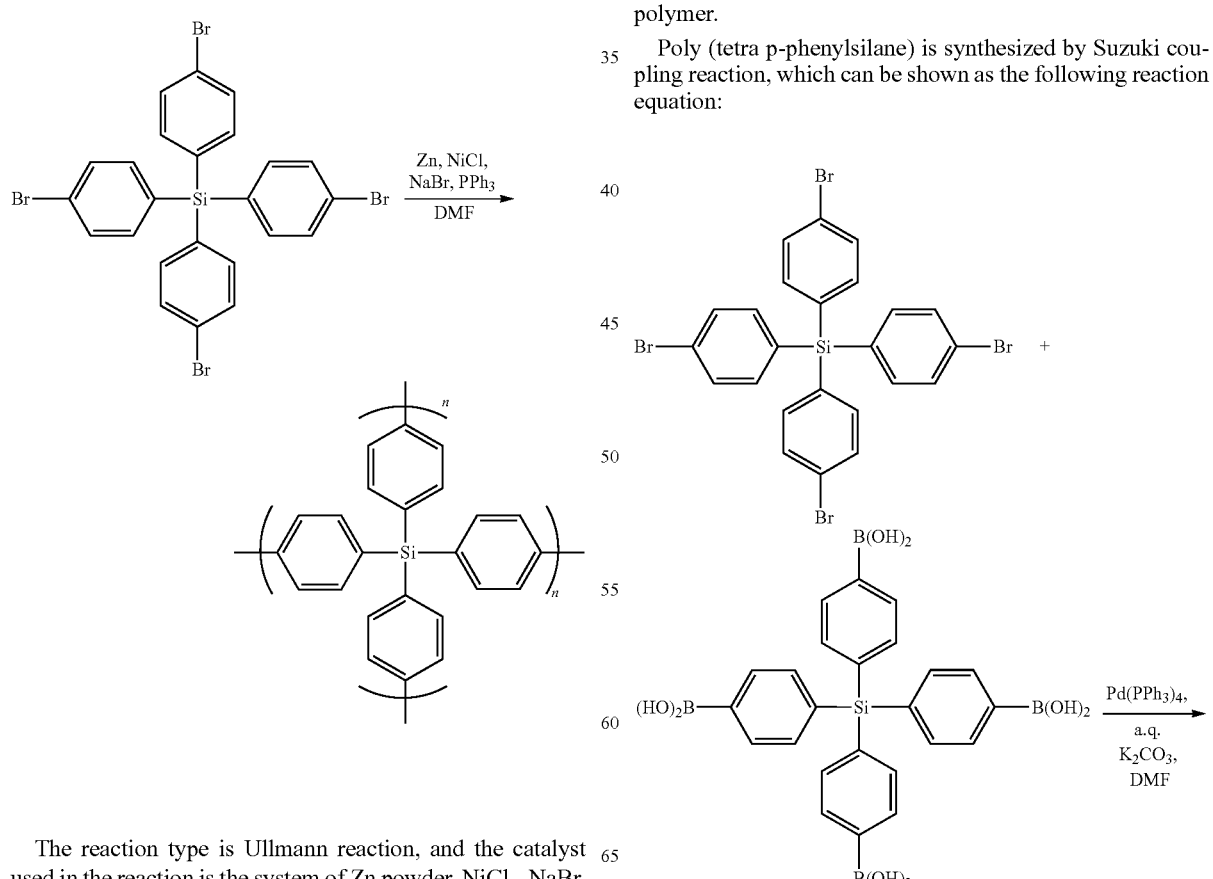

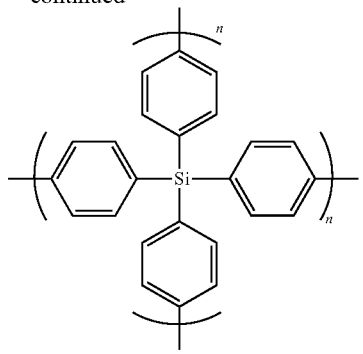

The reaction type is Suzuki coupling reaction, and the catalyst used in the reaction is the system of Pd(PPh$_3$)$_4$ and alkaline solution.

The synthetic method comprises the following steps:

Step 1, adding monomer with its initial concentration being 0.001 M-5 M, and Pd(PPh$_3$)$_4$ with its initial molar concentration being 0.05%-50% of the molar concentration of the monomer to a solution of DMF or toluene, and stirring the mixture for 0-10 hours under nitrogen atmosphere;

Step 2, adding aqueous alkaline solution with its initial molar concentration being 4-200 times of the molar concentration of the monomer to the resultant solution;

Step 3, heating the above mentioned solution at 20-140° C. for 10 minutes to 10 days;

Step 4, cooling the mixture to room temperature, and then adding conc. HCl to the mixture;

Step 5, filtrating the mixture to obtain the residue, then washing the residue with hot water, THF and CHCl$_3$, respectively, and then drying the residue in vacuum for 4-40 hours at 80-200° C. to obtain the porous polymer.

Step 5 comprises the following steps:

Step 5.1, treating the above mentioned crude polymer by 10-100 ml water at 50-100° C. for 3-5 times and then isolating the above mentioned crude polymer by filtration;

Step 5.2, treating the above mentioned crude polymer by 10-100 ml THF at 20-70° C. for 3-5 times and then isolating the above mentioned crude polymer by filtration;

Step 5.3, treating the above mentioned crude polymer by 10-100 ml CHCl$_3$ at 20-60° C. for 3-5 times and then isolating the above mentioned crude polymer by filtration;

Step 5.4, drying the polymer in vacuum at 3-10 mmHg for 4-40 hours at 80-200° C., and then obtaining the pure porous polymer.

To further describe the three synthetic methods of the porous polymer of the present invention, the following will further describe typical compounds that are synthesized by five different types of monomers, and the corresponding three synthetic methods thereof. In the general formulas of the following five monomers, the substituent R1, R2, R3, or R4 is phenyl, naphthyl, biphenylyl, pyridyl, pyridazinyl, triazinyl, tetrazinyl, pentazinyl, Hexazinyl, or 1-phenylpyridinyl. Any position of the substituent R1, R2, R3, or R4 can be provided with one or more substituents, such as methyl, ethyl, amido, carboxyl, methoxyl, hydroxyl, or ester group. The connection mode of the substituents may be connecting the substituents at any position. Ionic polymer involved in the present invention is all provided with corresponding counterion, so as to make the final material to be electrically neutral.

1. Poly tetra aryl methane monomer has the general formula of

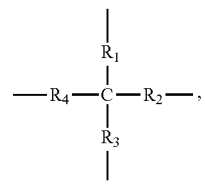

and a typical compound that can be synthesized with it is poly tetrabiphenyl-4-ylmethane with the structural formula of

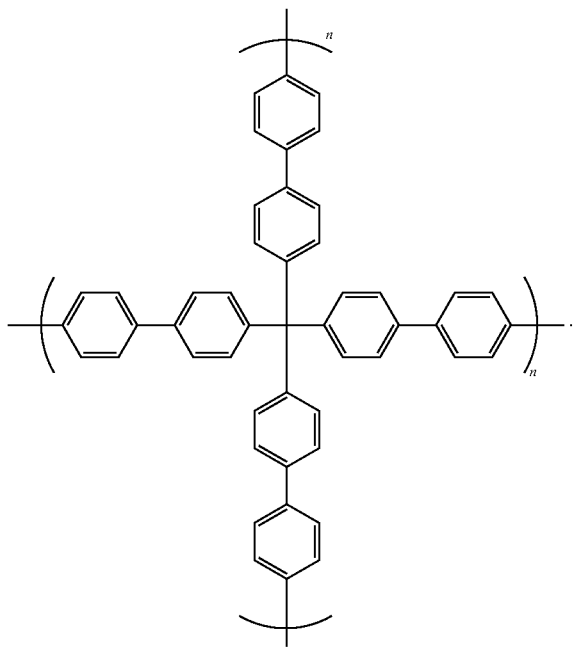

In the first two methods (Yamamoto type Ullmann reaction, Ullmann reaction), the reactive monomer is:

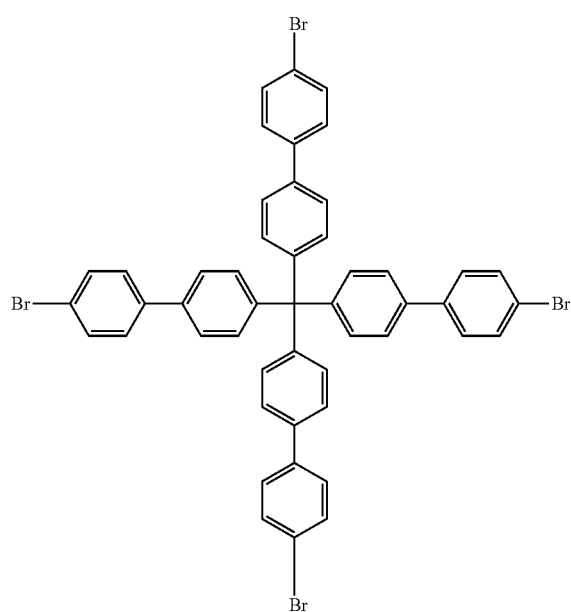 [SMILES: Brc1ccc(-c2ccc(C(c3ccc(-c4ccc(Br)cc4)cc3)(c3ccc(-c4ccc(Br)cc4)cc3)c3ccc(-c4ccc(Br)cc4)cc3)cc2)cc1]

(tetrakis(4'-bromobiphenyl-4-yl)methane) or

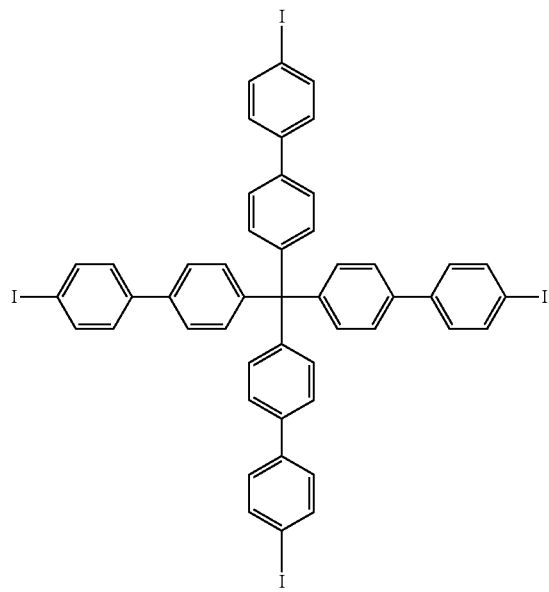 [SMILES: Ic1ccc(-c2ccc(C(c3ccc(-c4ccc(I)cc4)cc3)(c3ccc(-c4ccc(I)cc4)cc3)c3ccc(-c4ccc(I)cc4)cc3)cc2)cc1]

(tetrakis(4'-iodobiphenyl-4-yl)methane).

In the third method (Suzuki coupling reaction), the reactive monomer is:

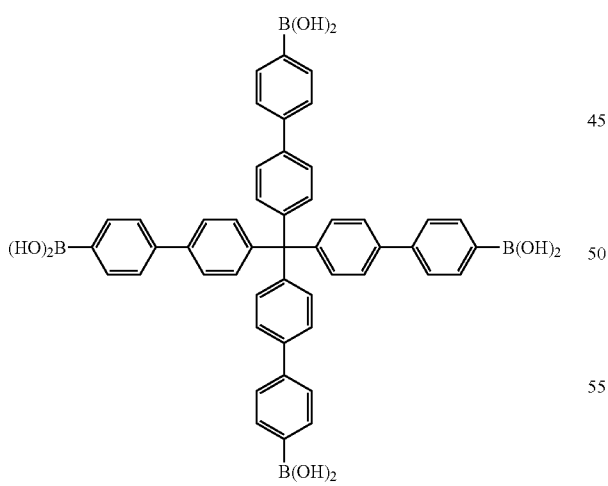

(4',4'',4''',4''''-methanetetrayltetrakis(biphenyl-4',4-diyl) tetraboronic acid) and

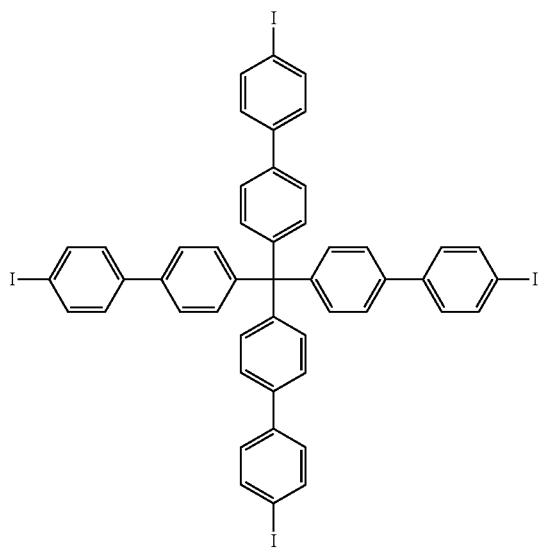 [SMILES: Ic1ccc(-c2ccc(C(c3ccc(-c4ccc(I)cc4)cc3)(c3ccc(-c4ccc(I)cc4)cc3)c3ccc(-c4ccc(I)cc4)cc3)cc2)cc1]

(tetrakis(4'-iodobiphenyl-4-yl)methane).

2. Poly tetra aryl silane monomer has the general formula of

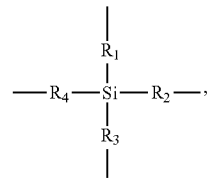

and a typical compound that can be synthesized with it is poly tetra p-phenylsilane with the structural formula of

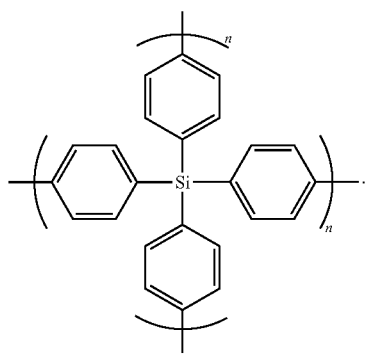

In the first two methods (Yamamoto type Ullmann reaction, Ullmann reaction), the reactive monomer is:

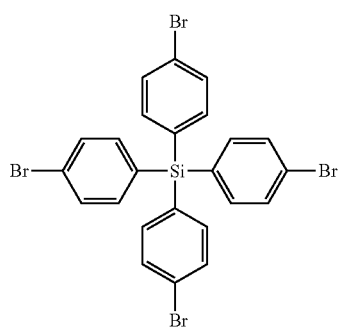 [SMILES: Brc1ccc([Si](c2ccc(Br)cc2)(c2ccc(Br)cc2)c2ccc(Br)cc2)cc1]

(tetrakis(4-bromophenyl)silane) or

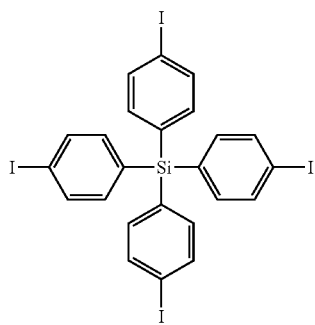

(tetrakis(4-iodophenyl)silane).

In the third method (Suzuki coupling reaction), the reactive monomer is:

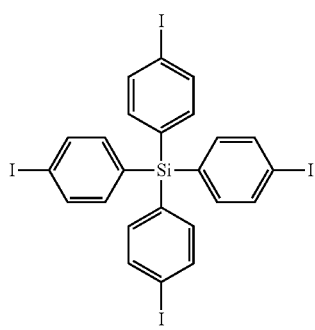

(tetrakis(4-iodophenyl)silane) and

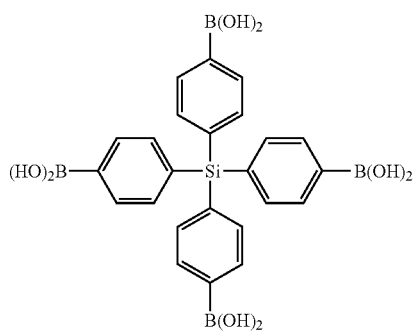 [SMILES: OB(O)c1ccc([Si](c2ccc(B(O)O)cc2)(c2ccc(B(O)O)cc2)c2ccc(B(O)O)cc2)cc1]

(4,4',4'',4'''-silanetetrayltetrakis(benzene-4,1-diyl)tetraboronic acid).

3. Poly tetra aryl ammonium salt monomer has the general formula of

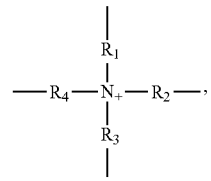

and a typical compound that can be synthesized with it is poly tetra p-phenylammonium salt with the structural formula of

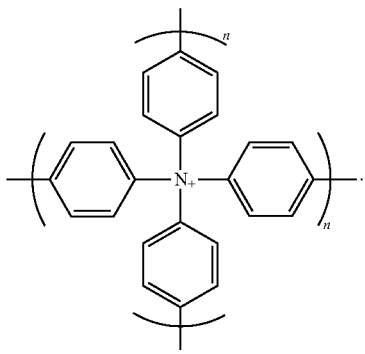

In the first two methods (Yamamoto type Ullmann reaction, Ullmann reaction), the reactive monomer is:

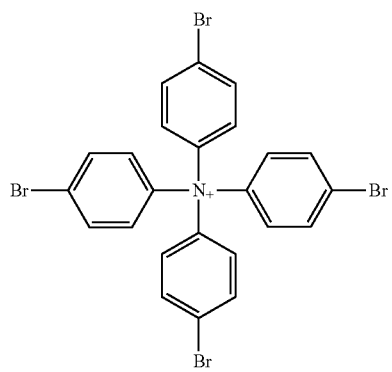

(tetrakis(4-bromophenyl)ammonium salt) or

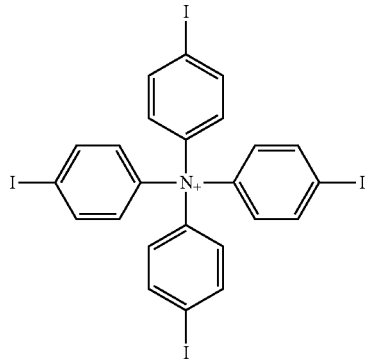 [SMILES: Ic1ccc([N+](c2ccc(I)cc2)(c2ccc(I)cc2)c2ccc(I)cc2)cc1]

(tetrakis(4-iodophenyl)ammonium salt).

In the third method (Suzuki coupling reaction), the reactive monomer is:

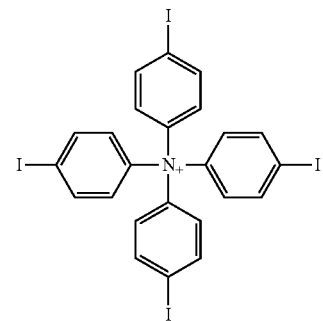 [SMILES: Ic1ccc([N+](c2ccc(I)cc2)(c2ccc(I)cc2)c2ccc(I)cc2)cc1]

(tetrakis(4-boronophenyl)ammonium salt).

4. Poly tetra aryl phosphonium salt monomer has the general formula of

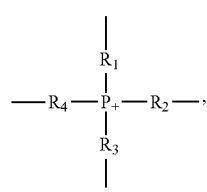

and a typical compound that can be synthesized with it is poly tetra p-phenylphosphonium salt with the structural formula of

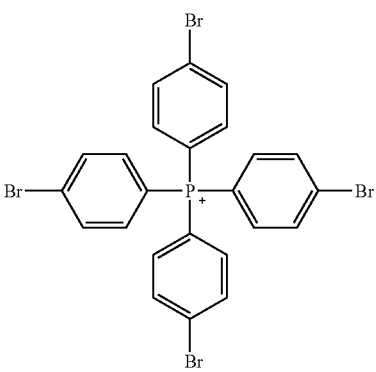 [SMILES: Brc1ccc([P+](c2ccc(Br)cc2)(c2ccc(Br)cc2)c2ccc(Br)cc2)cc1]

In the first two methods (Yamamoto type Ullmann reaction, Ullmann reaction), the reactive monomer is:

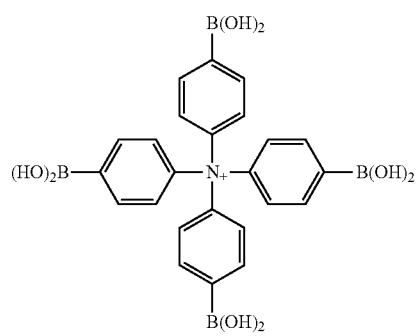

(tetrakis(4-bromophenyl)phosphonium salt) or

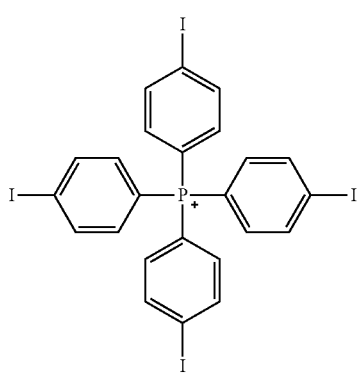

(tetrakis(4-iodophenyl)phosphonium salt).

In the third method (Suzuki coupling reaction), the reactive monomer is:

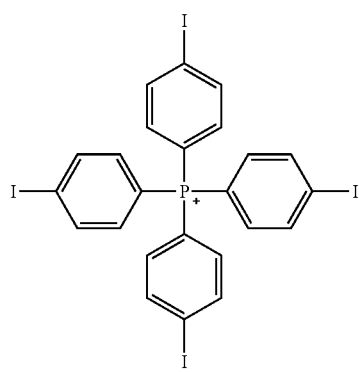

(tetrakis(4-iodophenyl)phosphonium salt) and

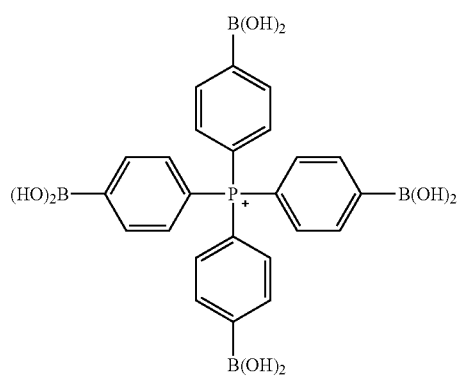

(tetrakis(4-boronophenyl)phosphonium salt).

5. Poly tetra aryl borate salt monomer has the general formula of

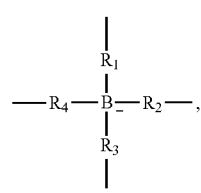

and a typical compound that can be synthesized with it is poly tetra p-phenylborate salt with the structural formula of

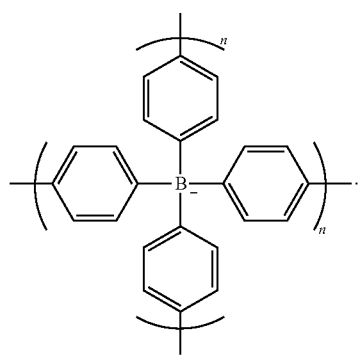

In the first two methods (Yamamoto type Ullmann reaction, Ullmann reaction), the reactive monomer is:

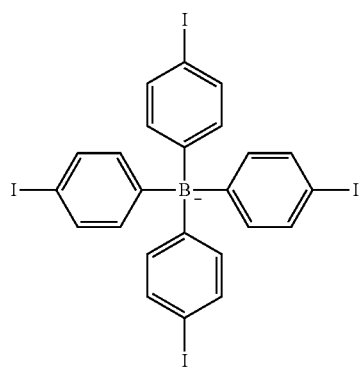 [SMILES: Ic1ccc([B-](c2ccc(I)cc2)(c2ccc(I)cc2)c2ccc(I)cc2)cc1]

(tetrakis(4-bromophenyl)borate salt) or

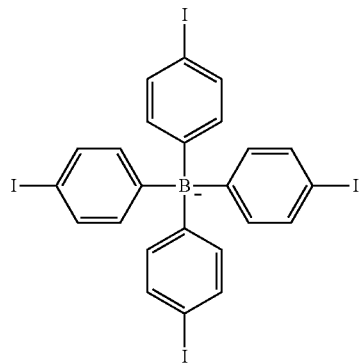

(tetrakis(4-iodophenyl)borate salt).

In the third method (Suzuki coupling reaction), the reactive monomer is:

(tetrakis(4-iodophenyl)borate salt) and

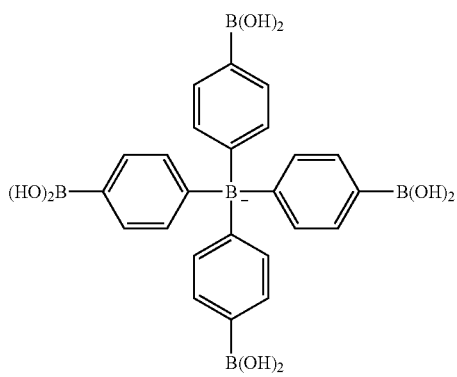 [SMILES: OB(O)c1ccc([B-](c2ccc(B(O)O)cc2)(c2ccc(B(O)O)cc2)c2ccc(B(O)O)cc2)cc1]

(tetrakis(4-boronophenyl)borate salt).

As an example, the following will detailedly describe synthesizing poly tetra p-phenylmethane by Yamamoto Type Ullmann coupling reaction.

Referring to FIGS. 1A and 1B, the topology structures of polymerization products from the monomer in accordance with an embodiment of the present invention are shown. The polymer that is synthesized can be regarded as a porous polymer that has super high specific surface area and is formed by connecting the carbon atoms of diamond via biphenylyl. The molecular formula of poly tetra p-phenylmethane is $(C(Ph)_4)_n$, and its structural formula is

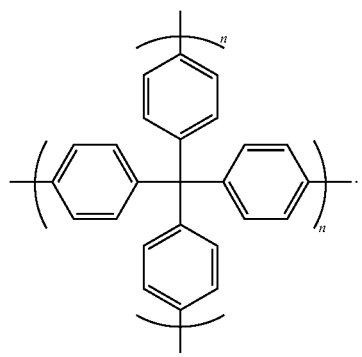

The reaction process can be shown as the following reaction equation:

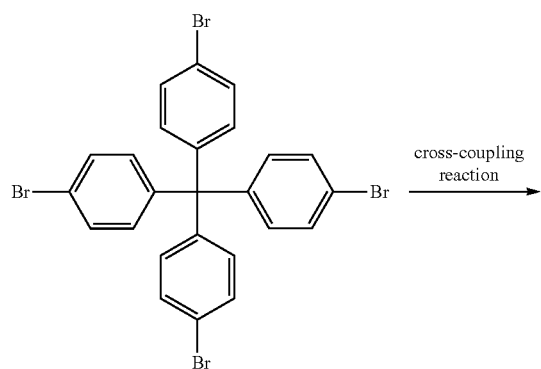

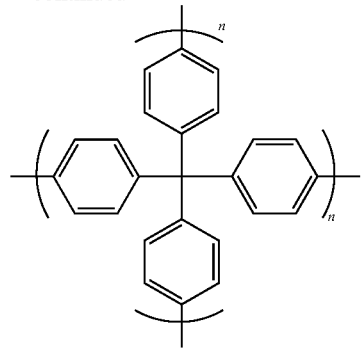

The synthetic method of poly tetra p-phenylmethane in the present invention comprises the following steps:

Step 1, adding bis(1,5-cycloocta-1,5-diene)nickel(0), 2,2'-bipyridyl, and 1,5-cycloocta-1,5-diene with same molar ratio to a solution of DMF (N,N-dimethyl-Formamide) or toluene, and heating the mixture at 20-140° C. for 0.5-3 hours;

Step 2, adding corresponding quantity of reactive monomer to the resultant solution, keeping the initial concentration of the monomer between 0.001 M and 5 M, and at the same time, making the initial molar ratio of bis(1,5-cycloocta-1,5-diene)nickel(0) to the halogen to be 0.6 to 1.5;

Step 3, stirring the above mentioned mixture at 20-140° C. for 10 minutes to 5 days;

Step 4, cooling the mixture to room temperature, and then adding conc. HCl to the mixture;

Step 5, filtrating the mixture to obtain the residue, then washing the residue with hot water, THF and $CHCl_3$ respectively, and then drying the residue in vacuum for 4-40 hours at 80-200° C. to obtain the poly tetra p-phenylmethane.

The following steps are adopted to concretely synthesize poly tetra p-phenylmethane.

(1) To a 1 mL of DMF solution was added 1 g of bis(1,5-cycloocta-1,5-diene)nickel(0), 0.568 g of 2,2'-bipyridyl, and 0.4 mL of 1,5-cycloocta-1,5-diene, and the mixture was heated at 60° C. for 0.5-3 hours;

(2) To the resultant solution was added 3 mL of 0.2 M tetrakis(4-bromophenyl)methane DMF solution, and stirred at that temperature for 60 hours;

(3) After cooling to room temperature, conc. HCl was added to the mixture;

(4) After filtration the residue was washed with 100 mL hot water, THF, and $CHCl_3$, respectively;

(5) After dried in vacuum at 3-10 mmHg for 4-40 hours at 80-200° C., the pure porous polymer was obtained with 76% yield.

FIG. 1A shows the topology structure of diamond and FIG. 2A shows the topology structure of poly tetra p-phenylmethane that is synthesized with tetrakis(4-bromophenyl) methane via Yamamoto Type Ullmann coupling reaction.

Referring to FIG. 2A and FIG. 2B, FT-IR of poly tetra p-phenylmethane that is synthesized with tetrakis(4-bromophenyl)methane via Yamamoto Type Ullmann coupling reaction, and the reactive monomer are shown. The solid line shows IR absorption of the monomer, and the dashed line shows IR absorption of the porous polymer. Characterization absorption bands for Carbon-Bromine highlighted, clearly shows the lack of bromine in the final product and indicates the completely formation of the porous polymer.

Figure 3:
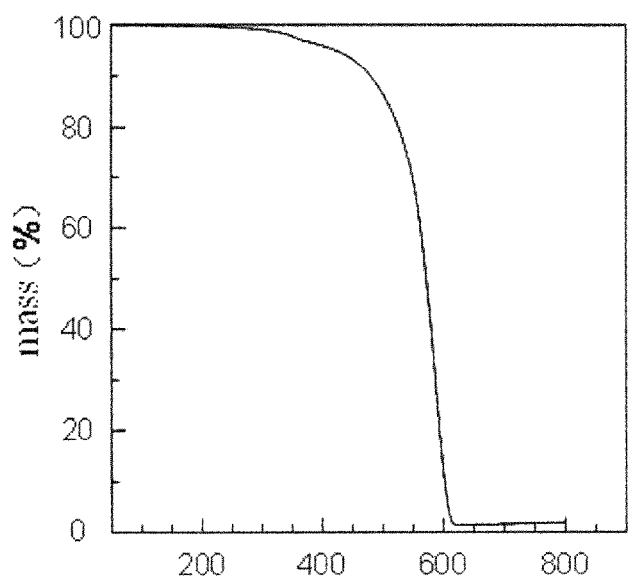
FIG. 3 provides the TGA plot of polymerization products from the monomer in accordance with an embodiment of the present invention at air condition.

Referring to FIG. 3, a thermogravimetric diagram of a porous polymer that is synthesized with tetrakis(4-bromophenyl)methane via Yamamoto Type Ullmann coupling reaction is shown. According to the result, the temperature of 5% mass loss of this porous polymer is 420° C., which means that the porous polymer has a very good thermal stability.

Figure 4:
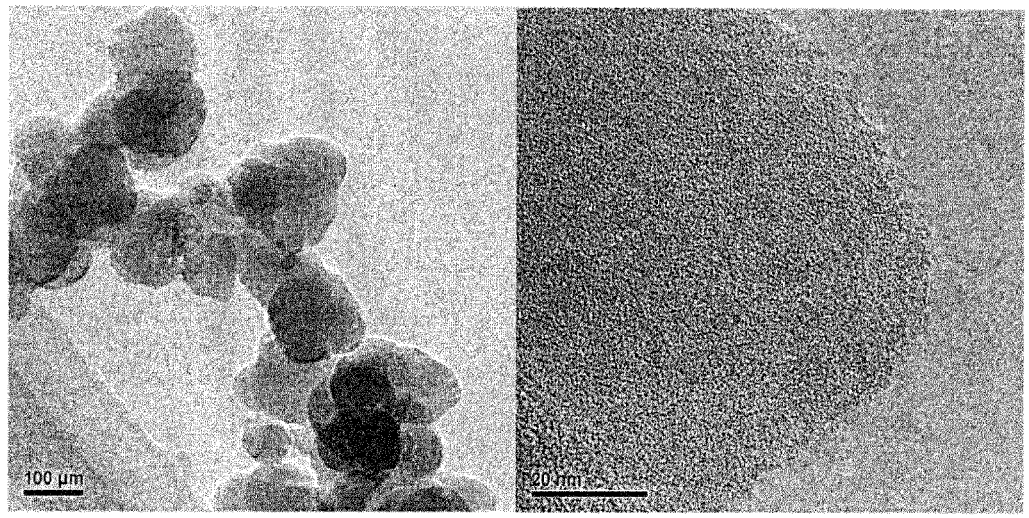
FIG. 4 provides TEM of polymerization products from the monomer in accordance with an embodiment of the present invention via Yamamoto Type Ullmann coupling reaction.

FIG. 4 shows a TEM photography of a porous polymer that is synthesized with tetrakis(4-bromophenyl)methane via Yamamoto Type Ullmann coupling reaction. According to the TEM results, wormlike porestructures can clearly be observed.

Figure 5:
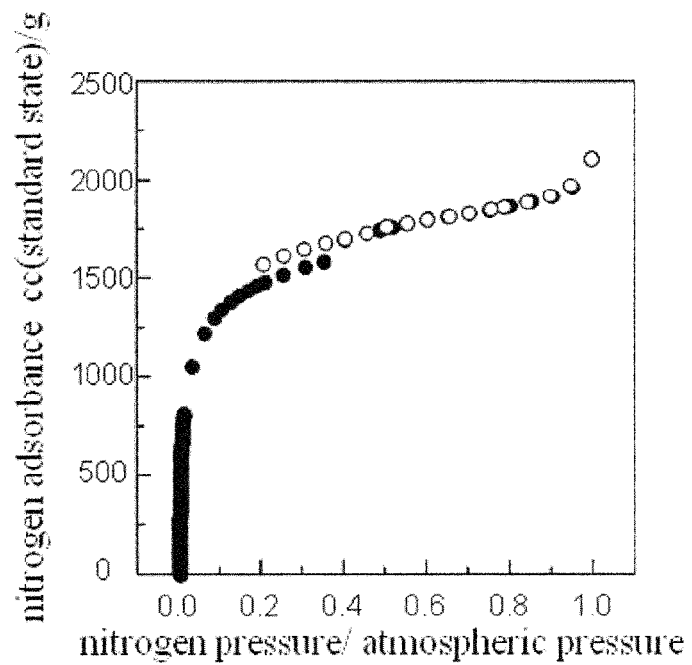
FIG. 5 provides $N_2$ absorption-desorption isotherm of polymerization products from the monomer in accordance with an embodiment of the present invention via Yamamoto Type Ullmann coupling reaction.

FIG. 5 shows a $N_2$ absorption-desorption isotherm of a porous polymer that is synthesized with tetrakis(4-bromophenyl)methane via Yamamoto Type Ullmann coupling reaction at 77K. The solid dot shows the absorption curve, and the hollow dot shows the desorption curve. According to the $N_2$ absorption-desorption isotherm, the BET specific surface area of the porous polymer is 5600 $m^2/g$.

Figure 6:
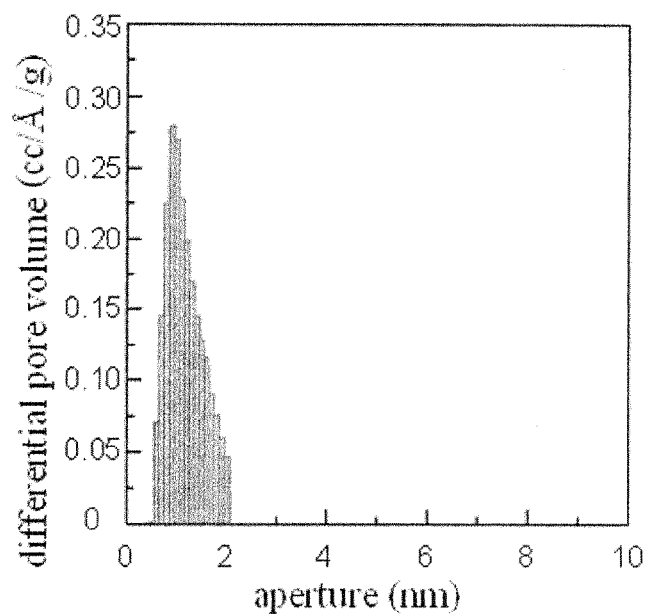
FIG. 6 provides pore size distribution of polymerization products from the monomer in accordance with an embodiment of the present invention via Yamamoto Type Ullmann coupling reaction.

FIG. 6 provides a pore size distribution of a porous polymer that is synthesized with tetrakis(4-bromophenyl)methane via Yamamoto Type Ullmann coupling reaction. The pore size distribution is calculated according to H-K method. Indicated in FIG. 7, the average pore diameter of the porous polymer is about 1 nm.

Figure 7:
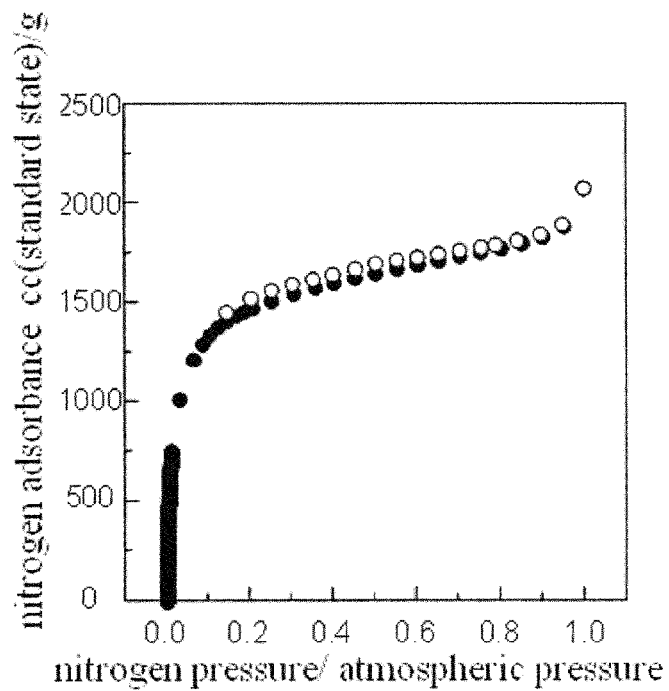
FIG. 7 provides the $N_2$ absorption-desorption isotherm of polymerization products from the monomer in accordance with an embodiment of the present invention after treated by boiling water for 7 days, which is synthesized via Yamamoto Type Ullmann coupling reaction.

FIG. 7 shows a $N_2$ absorption-desorption isotherm of a porous polymer after treated by boiling water for 7 days, which is synthesized with tetrakis(4-bromophenyl)methane via Yamamoto Type Ullmann coupling reaction. The solid dot shows the absorption curve, and the hollow dot shows the desorption curve. After treated in boiling water for even 7 days, the surface area of the porous polymer has almost no change, which indicates the excellent hydrothermal stability.

Figure 8:
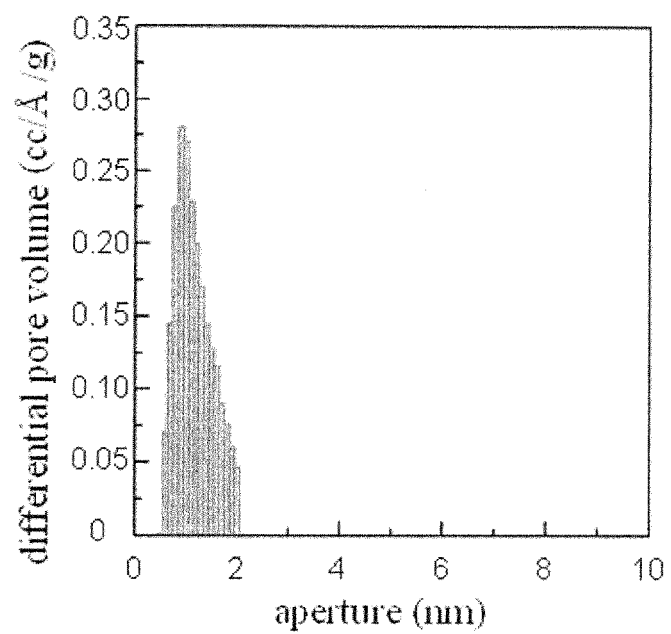
FIG. 8 provides the pore size distribution of polymerization products from the monomer in accordance with an embodiment of the present invention after treated by boiling water for 7 days, which is synthesized via Yamamoto Type Ullmann coupling reaction.

FIG. 8 shows the pore size distribution of a porous polymer after treated by boiling water for 7 days, which is synthesized with tetrakis(4-bromophenyl)methane via Yamamoto Type Ullmann coupling reaction. The pore size distribution is calculated according to H-K method. After treated by boiling waters the pore size has almost no change.

Figure 9A:
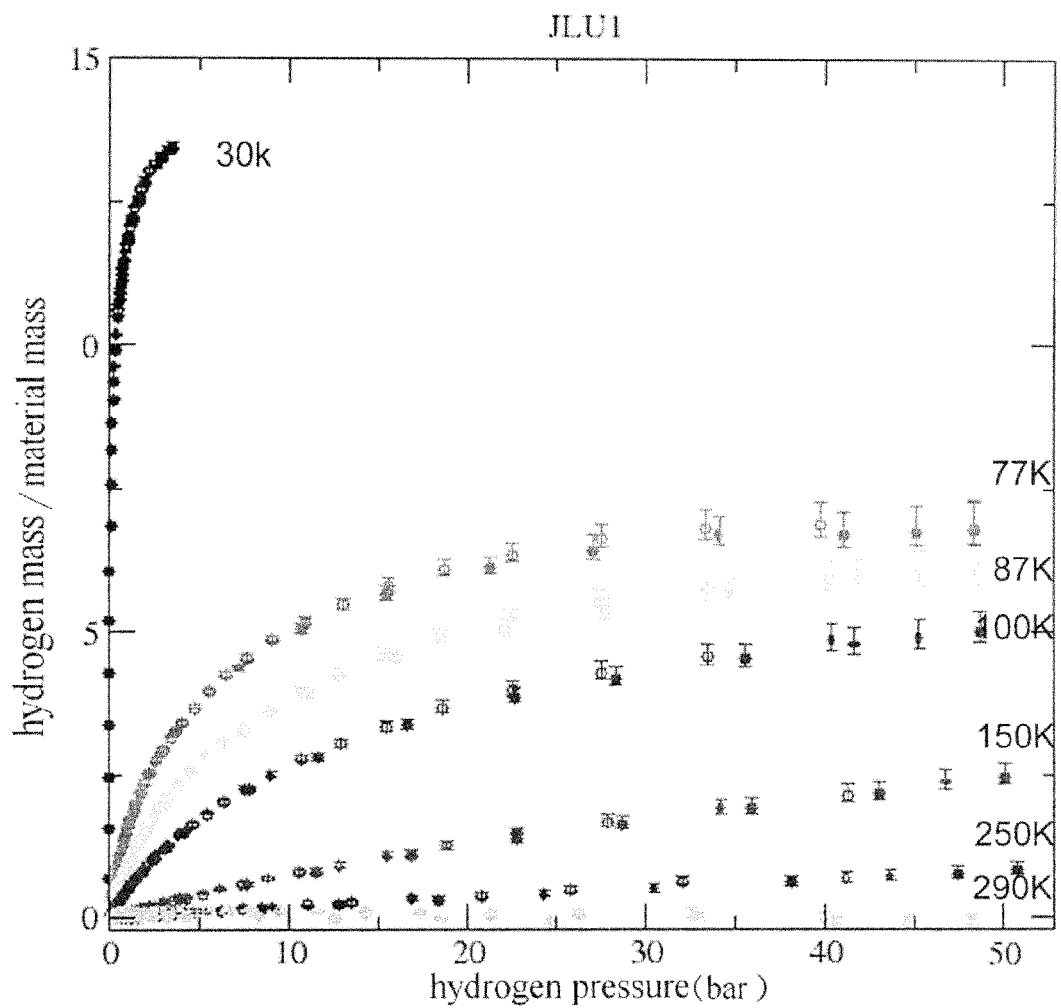
FIGS. 9A and 9B provide absorption isotherms of polymerization products from the monomer in accordance with an embodiment of the present invention storing $H_2$ at high pressure.
Figure 9B:
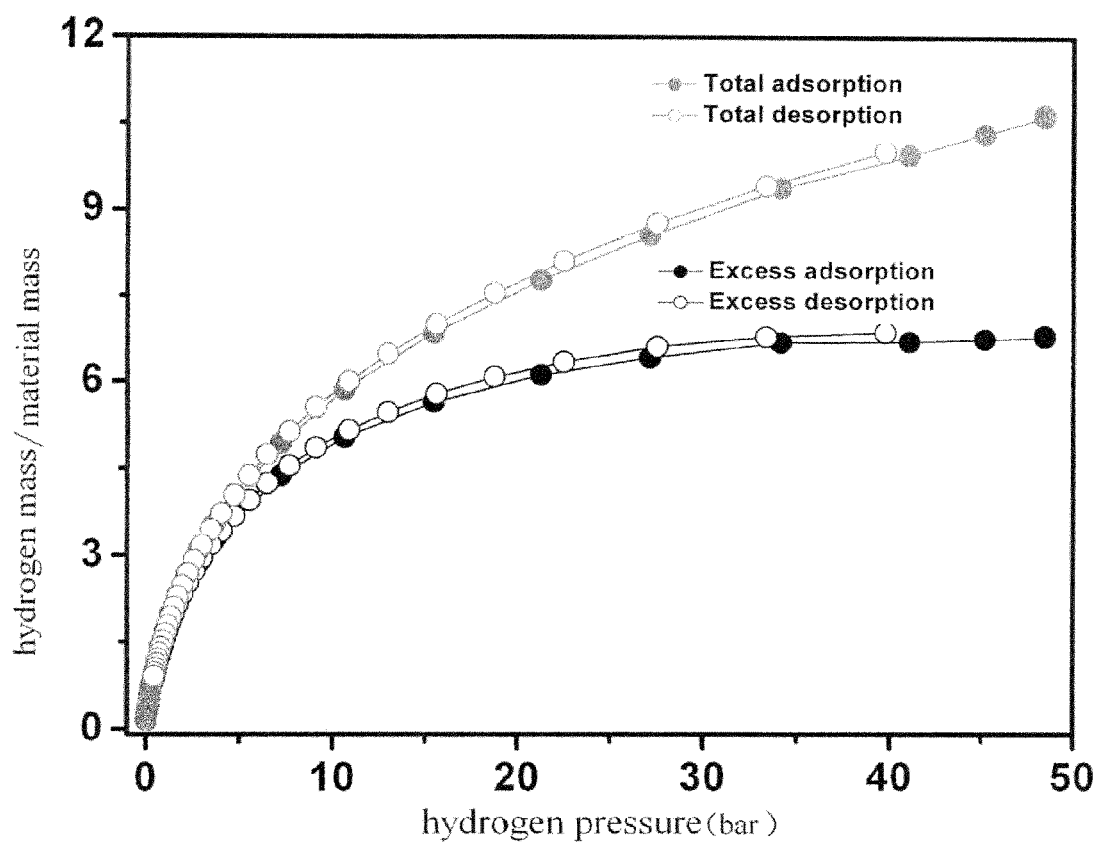

FIG. 9A and FIG. 9B show absorption isotherms of a porous polymer storing $H_2$ with different temperature at high pressure, which is synthesized with tetrakis(4-bromophenyl) methane via Yamamoto Type Ullmann coupling reaction. As shown in FIGS. 9A and 9B, the excess hydrogen uptake capacity of PPB-1 at 48 bar, 77 K can reach 7.0 wt %, which corresponds to an absolute uptake of 10.7 wt %. These values are comparable to the best performances of conventional high-surface area porous MOFs and COFs, and represent the highest among porous organic polymers.

Figure 10:
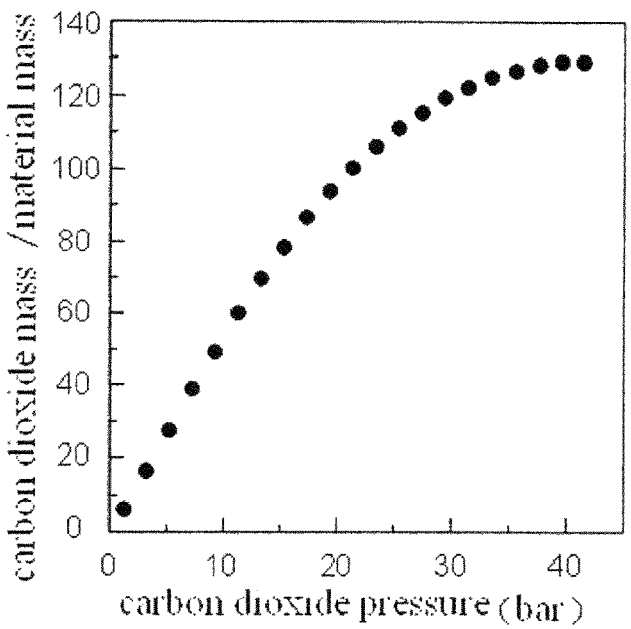
FIG. 10 provides absorption isotherm of polymerization products from the monomer in accordance with an embodiment of the present invention storing $CO_2$ at high pressure, which is synthesized via Yamamoto Type Ullmann coupling reaction.
Figure 11:
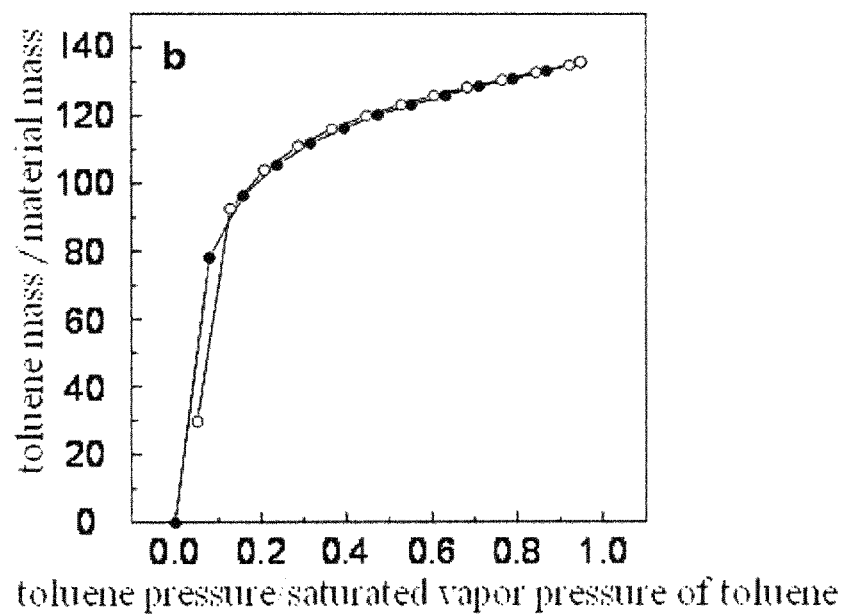
FIG. 11 provides toluene vapor adsorption isotherms at 298K.
Figure 12:
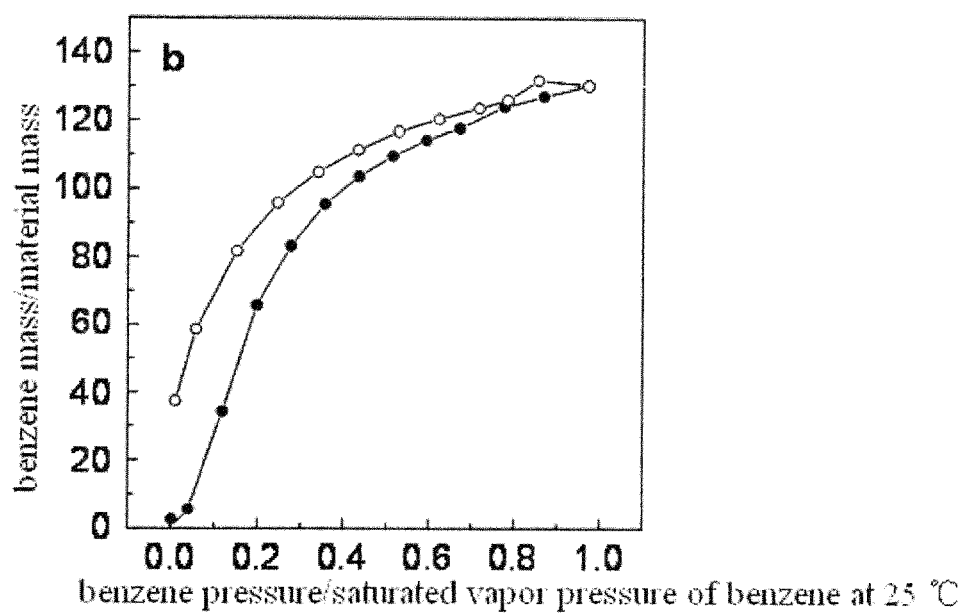
FIG. 12 provides benzene vapor adsorption isotherms at 298K.

High-pressure $CO_2$ adsorption isotherm at 298 K was also collected to assess the potential of PPB-1 for carbon dioxide capture application. As indicated in FIG. 10, porous polymer which is synthesized with tetrakis(4-bromophenyl)methane can adsorb 1300 mg/g $CO_2$ at 40 bar and at room temperature, which is also among the highest for conventional porous materials. Given the hydrophobicity of porous polymer together with its exceptional surface area, we also explored its capability for adsorption of organic vapors such as benzene and toluene, chemicals which are of environmental concern. As indicated in FIGS. 11 and 12, porous polymer can adsorb large amounts of benzene and toluene vapors at room temperature with values of 1306 mg/g (16.74 mmol/g) and 1357 mg/g (14.73 mmol/g) respectively at their saturated vapor pressures. The excellent sorption performances of this porous polymer, widely surpassing that of all conventional porous materials, promises great potential for further environmental application of this material.

The porous polymer poly tetra p-phenylmethane of the present invention has super high specific surface area for storing gas, which can be used to store hydrogen. Using the porous polymer to store hydrogen comprises the following steps:

(1) after activation, using an ordinary oil bump to dry the activated porous polymer in vacuum for 4-40 hours at 80-200° C.;

(2) at 290K-30K, at the pressure of 1-50 bar, testing the hydrogen storage capacity of the above mentioned material.

The porous polymer of the present invention has super high specific surface area for storing gas, which can also be used to store carbon dioxide. Using the porous polymer to store carbon dioxide comprises the following steps:

(1) after activation, using an ordinary oil bump to dry the activated porous polymer in vacuum for 4-40 hours at 80-200° C.;

(2) at 25° C., at the pressure of 1-42 bar, testing the carbon dioxide storage capacity of the above mentioned material.

The porous polymer poly tetra p-phenylmethane of the present invention has super high specific surface area for adsorbing liquid, which can be used to adsorb toluene. Using the porous polymer to adsorb toluene comprises the following steps:

(1) after activation, using an ordinary oil bump to dry the activated porous polymer in vacuum for 4-40 hours at 80-200° C.;

(2) at 25° C., at the pressure of 0-1 bar, testing the toluene adsorbing capacity of the above mentioned material.

The porous polymer poly tetra p-phenylmethane of the present invention has super high specific surface area for adsorbing liquid, which can also be used to adsorb benzene. Using the porous polymer to adsorb benzene comprises the following steps:

(1) after activation, using an ordinary oil bump to dry the activated porous polymer in vacuum for 4-24 hours at 80-200° C.;

(2) at 25° C., at the pressure of 0-1 bar, testing the benzene adsorbing capacity of the above mentioned material.

Herein, we present a strategy that has enabled us to achieve a structure possessing by far the highest surface area as well as exceptional thermal and hydrothermal stabilities. For example, poly tetra p-phenylmethane synthesized by present invention has rigid aromatic open framework which has a Langmuir surface area of 7100 $m^2/g$. Besides its exceptional surface area, poly tetra p-phenylmethane outperforms highly porous MOFs in thermal and hydrothermal stabilities, as well as demonstrates high uptake capacities of hydrogen (10.7% wt % at 77 K, 48 bar) and carbon dioxide (1300 mg/g at 298 K, 40 bar). Moreover, the aromatic backbone and high surface area enable poly tetra p-phenylmethane to possess unprecedented uptake capacities of benzene and toluene vapors at room temperature with values of 1306 mg/g (16.74 mmol/g) and 1357 mg/g (14.73 mmol/g) respectively at their saturated vapor pressures. The excellent sorption performances of poly tetra p-phenylmethane, widely surpassing that of all other porous materials, promises great potential for further environmental and energy application of this material.

The following non-limiting examples illustrate the various embodiments of the present invention. Those skilled in the art will recognize many variations that are within the spirit of the present invention and scope of the claims.

Example 1

(1) To 1 mL of DMF solution was added bis(1,5-cycloocta-1,5-diene)nickel(0) (1 g), 2,2'-bipyridyl (0.568 g) and 1,5-cycloocta-1,5-diene (0.4 mL) oand the mixture was heated at 50° C. for 0.5 hour;

(2) To the resultant mixture was added 3 mL tetrakis(4-bromophenyl)silane (DMF solution, 0.2 M), and stirred at that temperature for 60 hours;

(3) After cooling to room temperature, conc. HCl was added to the reaction mixture;

(4) After filtration the residue was washed with 100 mL hot water, THF, and $CHCl_3$, respectively;

(5) After dried in vacuum at 3-10 mmHg for 10-40 hours at 80-200° C., the pure porous polymer was obtained with 76% yield.

Example 2

The procedure is repeated in a manner similar to that of step (1) of example 1. The reaction mixture was injected into a stainless steel autoclave at 90° C., which yields a polymer with properties very similar to those of the polymer made in example 1.

Example 3

The procedure is repeated in a manner similar to that of example 1. The monomer was changed to tetrakis(4-iodophenyl)methane, which yields a polymer (84% yield) with properties very similar to those of the polymer made in example 1.

Example 4

The procedure is repeated in a manner similar to that of step (1) of example 1. 2,2'-bipyridyl and 0.4 mL of 1,5-cycloocta-1,5-diene are absent, which yields a polymer with properties very similar to those of the polymer made in example 1.

Example 5

The procedure is repeated in a manner similar to that of step (1) of example 1. The solvent changes to toluene, which yields a polymer with properties very similar to those of the polymer made in example 1.

Example 6

The procedure is repeated in a manner similar to that of step (1) of example 1. The solvent changes to DMAc, which yields a polymer with properties very similar to those of the polymer made in example 1.

Example 7

The procedure is repeated in a manner similar to that of step (1) of example 1. The solvent changes to NMP, which yields a polymer with properties very similar to those of the polymer made in example 1.

Example 8

The procedure is repeated in a manner similar to that of step (1) of example 1. The solvent changes to benzene, which yields a polymer with properties very similar to those of the polymer made in example 1.

Example 9

The procedure is repeated in a manner similar to that of step (1) of is example 1. The aging time extend to 10 hours and yields a polymer with properties very similar to those of the polymer made in example 1.

Example 10

(1) To a 1 L DMF solution was added tetrakis(4-bromophenyl)silane (6.52 g), 4,4',4'',4'''-silanetetrayltetrakis(benzene-4,1-diyl)tetraboronic acid (5.1 g), and $Pd(PPh_3)_4$ (0.1 g), and stirred the mixture under $N_2$ for 1 hour;

(2) To the above mentioned mixture was added 100 mL of 1 M $K_2CO_3$ aqueous solution;

(3) Keep the above mentioned mixture reflux for 3 days;

(4) After cooling to room temperature, dilute hydrochloric acid is added to the reaction system;

(5) After filtration, the mixture is washed by hot water, THF and $CHCl_3$, respectively;

(6) After dried in vacuum for 10-40 hours at 80-200° C., the pure porous polymer was obtained with 58% yield.

Example 11

The procedure is repeated in a manner similar to that of step (3) of example 10. The reaction mixture was injected into a stainless steel autoclave at 90° C., which yields a polymer with properties very similar to those of the polymer made in example 10.

Example 12

The procedure is repeated in a manner similar to that of example 10. The tetrakis(4-bromophenyl)silane was changed to tetrakis(4-iodophenyl)silane, which yields a polymer (76% yield) with properties very similar to those of the polymer made in example 1.

Example 13

The procedure is repeated in a manner similar to that of step (1) of example 10. The solvent changes to toluene, which yields a polymer with properties very similar to those of the polymer made in example 10.

Example 14

The procedure is repeated in a manner similar to that of step (1) of example 10. The solvent changes to DMAc, which yields a polymer with properties very similar to those of the polymer made in example 10.

Example 15

The procedure is repeated in a manner similar to that of step (1) of example 10. The solvent changes to NMP, which yields a polymer with properties very similar to those of the polymer made in example 10.

Example 16

The procedure is repeated in a manner similar to that of step (1) of example 10. The solvent changes to benzene, which yields a polymer with properties very similar to those of the polymer made in example 10.

Example 17

(1) To DMF is added $NiCl_2$ (0.09 g), NaBr (0.1 g), Zn powder (6.5 g), and $PPh_3$ (1.05 g), and the mixture was heated at 60° C. for 3 hours;

(2) To the resultant mixture was added tetrakis(4-bromophenyl)silane (6.5 g);

(3) keep the above mentioned solution stirred at 140° C. for 3 days;

(4) After cooling to room temperature, dilute hydrochloric acid was added to the reaction mixture;

(5) After filtration the residue was washed with hot water, of THF, and of CHCl₃, respectively;

(6) After dried in vacuum at 3-10 mmHg for 10-40 hours at 80-200° C., the pure porous polymer was obtained with 62% yield.

Example 18

The procedure is repeated in a manner similar to that of step (3) of example 17. The reaction mixture was injected into a stainless steel autoclave at 90° C., which yields a polymer with properties very similar to those of the polymer made in example 1.

Example 19

The procedure is repeated in a manner similar to that of step (2) of example 17. The tetrakis(4-bromophenyl)silane was changed to tetrakis(4-iodophenyl)silane, which yields a polymer (81% yield) with properties very similar to those of the polymer made in example 1.

Example 20

The procedure is repeated in a manner similar to that of step (1) of example 17. The solvent changes to toluene, which yields a polymer with properties very similar to those of the polymer made in example 17.

Example 21

The procedure is repeated in a manner similar to that of step (1) of example 17. The solvent changes to DMAc, which yields a polymer with properties very similar to those of the polymer made in example 17.

Example 22

The procedure is repeated in a manner similar to that of step (1) of example 17. The solvent changes to NMP, which yields a polymer with properties very similar to those of the polymer made in example 17.

Example 23

The procedure is repeated in a manner similar to that of step (1) of example 17. The solvent changes to benzene, which yields a polymer with properties very similar to those of the polymer made in example 17.

In summary, the porous polymer of the present invention has excellent thermal stability and good hydrothermal stability, which can be widely used in fields of energy source, or electric appliance, such as a power plant, an automobile, a wireless electric equipment, a mobile phone, or a portable device. Particularly, the porous polymer of the present invention can be used as the carrier of fuel in a fuel cell using fuels such as hydrogen with large specific surface area, high stability, and high efficiency in recycling use. Comparing with conventional materials, the material of the present invention can make a hydrogen fuel cell to have practical significance. The synthetic method of the porous polymer of the present invention has high yield.

Although the present invention has been described in detail with above said embodiments, but it is not to limit the scope of the invention. So, all the modifications and changes according to the characteristic and spirit of the present invention are involved in the protected scope of the invention.

What is claimed is:

1. A synthetic method of producing a porous polymer having the following general formula:

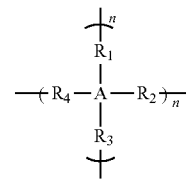

$A = C, Si, N^+, P^+, B^-$

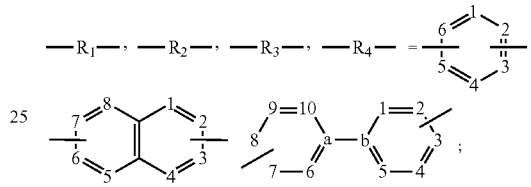

wherein, the positions marked with the numeral 1-10 being C, CH, N, or CH with its H being substituted by methyl, ethyl, amido, carboxyl, methoxyl, hydroxyl, or ester group; the positions marked with letter a or b being C, N⁺, or B⁻, and wherein n represents the number of monomeric units in the polymer, the method comprising the following steps:

Step 1, adding bis(1,5-cycloocta-1,5-diene)nickel(0), 2,2'-bipyridyl, and 1,5-cycloocta-1,5-diene with the molar ratio thereof being 1:(0-15):(0-15) to a solution of DMF (N,N-dimethyl-Formamide) or toluene, and heating the mixture at 20-140° C. for 0-10 hours;

Step 2, adding corresponding quantity of reactive monomer to the resultant solution, keeping the initial concentration of the monomer between 0.001 M and 5 M, and at the same time, making the initial molar ratio of bis(1,5-cycloocta-1,5-diene)nickel(0) to the monomer to be (2-18):1;

Step 3, stirring the above mentioned mixture at 20-140° C. for 10 minutes to 10 days;

Step 4, cooling the mixture to room temperature, and then adding conc. HCl to the mixture;

Step 5, filtrating the mixture to obtain the residue, then washing the residue with hot water, THF and CHCl3 respectively, and then drying the residue in vacuum for 4-40 hours at 80-200° C. to obtain the porous polymer.

2. The synthetic method of claim 1, wherein the reaction is Yamamoto type Ullmann reaction.

3. The synthetic method of claim 1, wherein Step 5 comprises the following steps:

Step 5.1, treating the above mentioned crude polymer by 10-100 ml water at 50-100° C. for 3-5 times and then isolating the above mentioned crude polymer by filtration;

Step 5.2, treating the above mentioned crude polymer by 10-100 ml THF at 20-70° C. for 3-5 times and then isolating the above mentioned crude polymer by filtration;

Step 5.3, treating the above mentioned crude polymer by 10-100 ml CHCl3 at 20-60° C. for 3-5 times and then isolating the above mentioned crude polymer by filtration;

Step 5.4, drying the polymer in vacuum at 3-10 mmHg for 4-40 hours at 80-200° C., and then obtaining the pure porous polymer.

4. The synthetic method of claim 1, wherein the general formula of the monomer is:

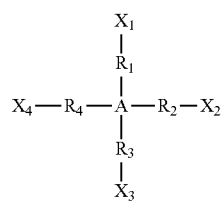

$A = C, Si, N^+, P^+, B^-$

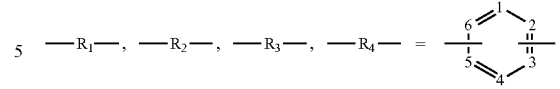

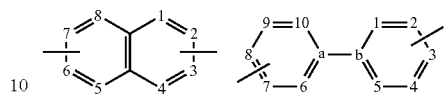

$X_1, X_2, X_3, X_4 = Cl, Br, I;$ wherein, the positions marked with the numeral 1-10 being C, CH, N, or CH with its H being substituted by methyl, ethyl, amido, carboxyl, methoxyl, hydroxyl, or ester group; the positions marked with letter a or b being C, $N^+$, or $B^-$.

* * * * *